United States Patent
Balraj et al.

(10) Patent No.: US 9,461,757 B2
(45) Date of Patent: Oct. 4, 2016

(54) METHOD AND DEVICE FOR PROCESSING A SIGNAL BASED ON A FIRST AND A SECOND COVARIANCE MEASURE

(71) Applicants: Rajarajan Balraj, Nuremberg (DE); Edgar Bolinth, Korschenbroich (DE)

(72) Inventors: Rajarajan Balraj, Nuremberg (DE); Edgar Bolinth, Korschenbroich (DE)

(73) Assignee: Intel IP Corporation, Santa Clara, CA (US)

( * ) Notice: Subject to any disclaimer, the term of this patent is extended or adjusted under 35 U.S.C. 154(b) by 213 days.

(21) Appl. No.: 13/927,715

(22) Filed: Jun. 26, 2013

(65) Prior Publication Data

US 2015/0003260 A1    Jan. 1, 2015

(51) Int. Cl.
*H04W 24/02*    (2009.01)
*H04B 17/26*    (2015.01)

(52) U.S. Cl.
CPC ..................... *H04B 17/26* (2015.01)

(58) Field of Classification Search
CPC .. H04W 24/02; H04L 5/0073; H04L 25/021; H04L 5/0005; H04L 25/0222; H04L 25/0242; H04L 27/2691; H04J 11/005; H04J 11/0023; H04J 11/0046; H04J 11/0063; H04B 1/10; H04B 1/1661; H04B 7/068
See application file for complete search history.

(56) References Cited

U.S. PATENT DOCUMENTS

| | | | |
|---|---|---|---|
| 2008/0273630 A1* | 11/2008 | Mege | H04L 1/005 375/341 |
| 2010/0284499 A1* | 11/2010 | Lindoff | 375/346 |
| 2012/0082274 A1* | 4/2012 | Bury | H04L 25/0202 375/346 |
| 2013/0188761 A1* | 7/2013 | Heikkila | 375/349 |
| 2013/0303090 A1* | 11/2013 | Hammarwall et al. | 455/67.13 |
| 2013/0344909 A1* | 12/2013 | Davydov et al. | 455/501 |
| 2014/0064106 A1* | 3/2014 | Balraj | H04W 24/10 370/252 |
| 2014/0072067 A1* | 3/2014 | Yu | H04L 1/0668 375/267 |
| 2014/0126403 A1* | 5/2014 | Siomina | 370/252 |
| 2014/0128115 A1* | 5/2014 | Siomina et al. | 455/501 |
| 2014/0160949 A1* | 6/2014 | Clausen et al. | 370/252 |
| 2014/0321296 A1* | 10/2014 | Balraj | 370/252 |

FOREIGN PATENT DOCUMENTS

| | | |
|---|---|---|
| JP | 2011-524711 A | 9/2011 |
| JP | 2012-519998 A | 8/2012 |
| WO | WO-2013/065822 A1 | 5/2013 |

OTHER PUBLICATIONS

TSG RAN G4 meeting #62bis, "FeICIC Baseline Receiver Assumptions," Jeju, South Korea, Mar. 26-30, 2012, R4-122185.
3GPP TSG-RAN WG1 #62, "Enabling Communication in Harsh Interference Scenarios," Madrid, Spain, Aug. 23-27, 2010, R1-104818.
3GPP TSG-RAN WG$ #60 Bis, "Reference receiver strucutre for Interference mitigation on Enhanced performance requirement for LTE UE" Zhuhai, CN Oct. 10-14, 2011, RA-115213.
Office Action dated May 29, 2015 for Japanese Patent Application No. 2014-128170 (with English translation).

\* cited by examiner

*Primary Examiner* — Ahmed Elallam
(74) *Attorney, Agent, or Firm* — Schiff Hardin LLP

(57) ABSTRACT

A method includes receiving a signal representing a two-dimensional time-frequency signal pattern, determining a first covariance measure based on a predetermined first signal part of the signal pattern, determining a second covariance measure based on a predetermined second signal part of the signal pattern, and processing the signal based on the first covariance measure and the second covariance measure.

13 Claims, 11 Drawing Sheets

METHOD AND DEVICE FOR PROCESSING A SIGNAL BASED ON A FIRST AND A SECOND COVARIANCE MEASURE

FIELD

The disclosure relates to a method and a device for processing a signal based on a first and a second covariance measure. The disclosure further relates to a device for determining a power of a demodulated pilot signal.

BACKGROUND

Wireless communication networks may include multiple base stations and multiple User Equipments (UEs). Signals transmitted between components of a wireless communication network may include interference. Methods and devices employed in wireless communication networks constantly have to be improved. In particular, it may be desirable to mitigate interference occurring in wireless communication networks.

BRIEF DESCRIPTION OF THE DRAWINGS

The accompanying drawings are included to provide a further understanding of aspects and are incorporated in and constitute a part of this specification. The drawings illustrate aspects and together with the description serve to explain principles of aspects. Other aspects and many of the intended advantages of aspects will be readily appreciated as they become better understood by reference to the following detailed description. Like reference numerals designate corresponding similar parts.

DETAILED DESCRIPTION

Figure 1:
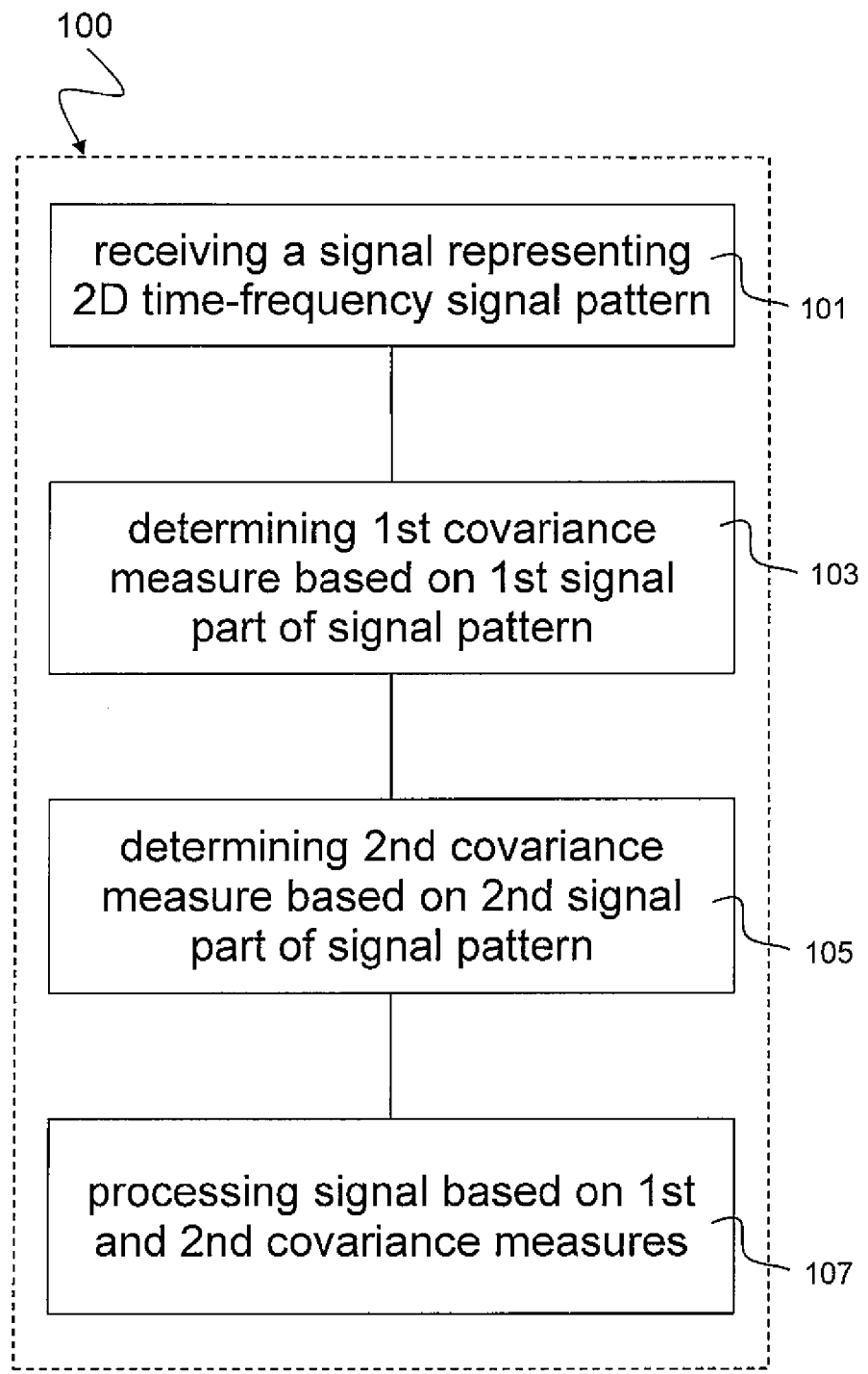
FIG. 1 is a schematic diagram of a method 100 in accordance with the disclosure for processing a signal based on a first and a second covariance measure.

In the following detailed description, reference is made to the accompanying drawings, which form a part thereof, and in which is shown by way of illustration specific aspects in which the disclosure may be practiced. It is understood that other aspects may be utilized and structural or logical changes may be made without departing from the scope of the present disclosure. The following detailed description, therefore, is not to be taken in a limiting sense, and the scope of the present disclosure is defined by the appended claims.

Heterogeneous networks may utilize a mix of diverse base stations deployed in order to improve the spectral efficiency per unit area. Such a layered network deployment can consist of regular placement of macro base stations that typically transmit at high power level (~5-40 W), overlaid with several pico cell, femto cells and relay that typically transmit at lower power levels (~100 mW-2 W). The lower power cells may be deployed to eliminate coverage holes in the macro cells and to provide efficiency in hot spots.

In heterogeneous networks, there may be a difference between low and high power base stations which can result in unfair distribution of data rates and uneven user experience among the user terminals in the network. Macro cell transmission can be restricted from using the same time-frequency resources as the low-power node by resource partitioning (enhanced Inter Cell Interference Coordination, eICIC). Resource partitioning can be either in frequency domain by using carrier aggregation or in time domain by using almost blank subframes (ABS).

The following terms, abbreviations and notations will be used herein:
eICIC: enhanced Inter-Cell Interference Coordination,
ABS: Almost Blank Sub-frames,
CRS: Cell specific Reference Signal,
RE: Resource Element,
IRC: Interference Rejection Combining,
IM: Interference Mitigation,
IC: Interference Canceling,
MMSE: Minimum Mean Square Error,
AP: Antenna Port,
SINR: Signal to Interference and Noise Ratio,
LTE: Long Term Evolution,
LTE-A: LTE Advanced, Release 10 and higher versions of LTE,
RF: Radio Frequency,
UE: User Equipment,
PDSCH: Physical Downlink Shared Channel,
PDCCH: Physical Downlink Control Channel,
MBSFN: Multicast/Broadcast over Single Frequency Network,
INR: Interference to Noise Ratio,
MCS: Modulation Coding Scheme,
EVA: Extended Vehicular A channel,
QPSK: Quadrature Phase Shift Keying,
QAM: Quadrature Amplitude Modulation,
RBSF: Resource Block Subframe, i.e., a resource block in frequency direction times subframe in time direction,
BER: Bit Error Rate,
BLER: Block Error Rate,
EVA5: "Extended Vehicular A model" multi-path fading propagation conditions according to 3GPP technical Specification 36.101 V11.3.0, using a Doppler frequency of 5 Hz, ETU5: "Extended Typical Urban model" multi-path fading propagation conditions according to 3GPP technical specification 36.101 V11.3.0, using a Doppler frequency of 5 Hz.

The methods and devices described herein may be based on two-dimensional signal patterns, reference resource elements and covariance measures. It is understood that comments made in connection with a described method may also hold true for a corresponding device configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

The methods and devices described herein may be implemented in wireless communication networks, in particular communication networks based on an LTE and/or OFDM standard. The methods and devices described below may further be implemented in a base station (NodeB, eNodeB) or a mobile device (or mobile station or User Equipment (UE)). The described devices may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

The methods and devices described herein may be configured to transmit and/or receive radio signals. Radio signals may be or may include radio frequency signals radiated by a radio transmitting device (or radio transmitter or sender) with a radio frequency lying in a range of about 3 Hz to about 300 GHz. The frequency range may correspond to frequencies of alternating current electrical signals used to produce and detect radio waves.

The methods and devices described herein may be designed to implement mobile standards such as e.g. the Long Term Evolution (LTE) standard. LTE, marketed as 4G LTE, is a standard for wireless communication of high-speed data for mobile phones and data terminals. It is based on the GSM/EDGE and UMTS/HSPA network technologies, increasing the capacity and speed using a different radio interface together with core network improvements.

In the following, Orthogonal Frequency-Division Multiplexing (OFDM) systems are described. OFDM is a scheme for encoding digital data on multiple carrier frequencies. OFDM has developed into a popular scheme for wideband digital communication, whether wireless or over copper wires, used in applications such as digital television and audio broadcasting, DSL broadband internet access, wireless networks, and 4G mobile communications. OFDM is a Frequency-Division Multiplexing (FDM) scheme used as a digital multi-carrier modulation method. A large number of closely spaced orthogonal sub-carrier signals may be used to carry data. The orthogonality may prevent crosstalk between sub-carriers. The data may be divided into several parallel data streams or channels, one for each sub-carrier. Each sub-carrier may be modulated with a conventional modulation scheme (such as quadrature amplitude modulation or phase-shift keying) at a low symbol rate, maintaining total data rates similar to conventional single-carrier modulation schemes in the same bandwidth. OFDM may be essentially identical to coded OFDM (COFDM) and discrete Multi-Tone modulation (DMT).

In the following, covariance measures, covariance matrices, signal covariance measures, noise covariance measures and interference covariance measures are described. The covariance measure may generalize the notion of variance to multiple dimensions. As an example, the variation in a collection of random points in two-dimensional space may not necessarily be characterized fully by a single number, nor would the variances in the x and y directions contain all of the necessary information; a $N_{Rx} \times N_{Rx}$ measure, where $N_{Rx}$ denotes the number of receive antennas, called the covariance measure may be necessary to fully characterize the two-dimensional variation. The covariance measure can be mathematically implemented as a covariance matrix, for example.

In probability theory and statistics, a covariance matrix (also known as dispersion matrix or variance covariance matrix) may be a matrix whose element in the position i, j is the covariance between the $i^{th}$ and $j^{th}$ elements of a random vector (that is, of a vector of random variables). Each element of the vector may be a scalar random variable, either with a finite number of observed empirical values or with a finite or infinite number of potential values specified by a theoretical joint probability distribution of all the random variables. If the entries in a column vector $X=(X_1, \ldots, X_n)^T$ are random variables, each with finite variance, then the covariance matrix S may be the matrix whose entry (i,j) is the covariance $cov(X_i, X_j) = E[(X_i - \mu_i)(X_j - \mu_j)]$, wherein $\mu_i = E(X_i)$ is the expected value of the i-th entry in the vector X.

In the following, multi-layer heterogeneous networks, macro cells, pico cells, femto cells, target cells, and interfering cells are described. Multi-layer heterogeneous networks (HetNet) may be used in LTE and LTE-Advanced standards to buildup the network of not only a single type of eNodeB (homogeneous network), but to deploy eNodeBs with different capabilities, most importantly different Tx-power classes. These eNodeBs may commonly may be referred to as macro eNodeBs (MeNB) or macro cells, pica eNodeBs (PeNB) or pico cells and femto/home eNodeBs (HeNB) or femto cells and meant for basic outdoor, outdoor hot-zone and indoor/enterprise coverage, respectively.

Macro cells may cover a large cell area (typical cell radius being of the order of 500 meters to a kilometer), with transmit antennas above the clutter and transmission power of the order of 46 dBm (20 watts). They may provide service to all users. Femto cells, also called Home eNodeBs (HeNBs) may be lower power cells installed (typically indoors) by an end-consumer. Pico cells may be operator deployed cells, with lower transmission powers—typically an order of magnitude smaller—relative to macro cell eNodeBs. They may be installed typically in wireless hotspot areas and provide access to all users. In a scenario where a UE is connecting to pica cells, the pica cell may represent the target cell while the macro cell may represent the interfering cell providing strong interference.

In the following, eICIC and Almost Blank Sub-frames (ABS) are described. eICIC may avoid heavy inter-cell interference on both data and control channels of the downlink. eICIC may be based on carrier aggregation with cross-carrier scheduling or based on Time-Domain Multiplexing (TDM) using so called ABS.

ICIC based on Carrier Aggregation may enable an LTE-A UE to connect to several carriers simultaneously. It not only may allow resource allocation across carriers, it also may allow scheduler based fast switching between carriers without time consuming handover. A simple principle in a HetNet scenario may be to partition the available spectrum into e.g. two separate component carriers and assign the primary component carriers (PCC) to different network layers. The primary component carrier may be the cell that provides the control information to the UEs. Each network layer can additionally schedule UEs on other CCs called Secondary Component Carriers (SCC).

ICIC based on Time Domain Multiplexing may periodically mute transmissions from eNodeBs inflicting severe interference onto others for entire subframes, so that the victim eNodeBs may have a chance to serve their UEs suffering from severe interference from the aggressor eNodeB in these subframes. This muting may be not necessarily complete, as certain signals such as Common reference symbols (unless configured as MBSFN subframe), Primary and Secondary Synchronization Signals (PSS and SSS), Physical Broadcast Channel (PBCH), SIB-1 and paging with their associated PDCCH may have to be transmitted even in otherwise muted subframes, e.g. to avoid radio link failure or for reasons of backwards compatibility. Collisions of subframe muting with PSS, SSS, SIB-1 and paging should be minimized. Hence, muting in subframes #0, #1, #5 and #9 should be avoided as far as possible. Sub-frames thus muted may be referred to as ABS.

In the following, demodulated pilot signals, whitening filters, IRC receivers and MIMO detectors are described. Demodulated pilot signals or sequences are noisy instantaneous channel coefficients which may be estimated based on a received data sequence and known pilot signals or sequences, e.g. by multiplying the received data sequence $y_P(i)$ by the conjugate complex values of a known pilot sequence $X_P(i)$. Optionally the result may be normalized by an energy of the known pilot sequence $X_P(i)$. Noise (and other additive distortions) usually may have non-flat amplitude spectrum. A noise whitening filter may equalize the spectrum of the signal, making it similar to the white noise spectrum. Noise whitening filters may enhance low level spectral components and may attenuate high level ones.

Interference Rejection Combining (IRC) is a technique that may be used in an antenna diversity system to suppress co-channel interference by using the cross covariance between the noise in diversity channels. Interference rejection combining (IRC) may be used as an efficient alternative to increase downlink bit rates in areas where cells overlap. An IRC receiver may be effective in improving the cell-edge user throughput because it may suppress inter-cell interference. The IRC receiver may be typically based on a Minimum Mean Square Error (MMSE) criteria, which may require channel estimation and covariance matrix estimation including the inter-cell interference with high accuracy.

Multiple-Input Multiple-Output (MIMO) wireless communication systems may employ multiple antennas at the transmitter and at the receiver to increase system capacity and to achieve better quality of service. In spatial multiplexing mode, MIMO systems may reach higher peak data rates without increasing the bandwidth of the system by transmitting multiple data streams in parallel in the same frequency band. A MIMO detector may be used for detecting the MIMO channel which may be described by the channel matrices between respective antennas of the transmitter and respective antennas of the receiver.

FIG. 1 is a schematic diagram of a method 100 in accordance with the disclosure for processing a signal based on a first and a second covariance measure. The method 100 may include a block 101 of receiving a signal representing a two-dimensional time-frequency signal pattern. The method 100 may include a block 103 of determining a first covariance measure based on a predetermined first signal part of the signal pattern. The method 100 may include a block 105 of determining a second covariance measure based on a predetermined second signal part of the signal pattern. The method 100 may include a block 107 of processing the signal based on the first covariance measure and the second covariance measure.

In one example of the method 100, the second signal part of the signal pattern may include a data signal, e.g. a data signal "D" as described below with respect to FIG. 4. In one example of the method 100, the second signal part of the signal pattern may be disturbed by an interference signal of at least one aggressor cell. In one example of the method 100, the interference signal of the aggressor cell interfering the second signal part of the signal pattern may include a cell-specific reference signal, e.g. a CRS signal "R1", "R2", "R4" and/or "R5" as described below with respect to FIG. 4. In one example of the method 100, the interference signal of the aggressor cell interfering with the second signal part of the signal pattern may include a demodulated reference signal. In one example of the method 100, the first signal part of the signal pattern may include a reference signal, e.g. a reference signal "R0" and/or "R3" as described below with respect to FIG. 4. In one example of the method 100, the first signal part of the signal pattern may include a cell-specific reference signal. In one example of the method 100, the first signal part of the signal pattern may include a demodulated reference signal.

In one example of the method 100, the processing the signal may include noise whitening the signal based on the first covariance measure and the second covariance measure. In one example, the method 100 may include noise whitening at least one of an undisturbed signal part of the signal pattern and channel estimates corresponding to the undisturbed signal part by using the first covariance measure. In one example, the method 100 may include noise whitening at least one of a signal part of the signal pattern being disturbed by an interference signal of at least one aggressor cell and channel estimates corresponding to the disturbed signal part by using the second covariance measure. In one example of the method 100, the signal may be encoded according to an orthogonal frequency division multiplex technique.

In one example of the method 100, determining the second covariance measure may be based on a power estimation with respect to a pilot signal of at least one aggressor cell. In one example of the method 100, the power estimation may include determining a difference of the demodulated pilot signal and the demodulated pilot signal subjected to a displacement in time. In one example of the method 100, the determining the second covariance measure may be based on an estimation of a first-order moment and a second-order moment with respect to a pilot signal of at least one aggressor cell. In one example of the method 100, the estimation of the first-order moment and the second-order moment may include determining a product of the demodulated pilot signal and a complex conjugate of the demodulated pilot signal subjected to a displacement in time. In one example of the method 100, determining the first-order moment may be based on a real operator of the product and determining the second-order moment may be based on an imaginary operator of the product.

In one example of the method 100, determining the power of the demodulated pilot signal may be based on a covariance measure of a difference of the demodulated pilot signal and the demodulated pilot signal subjected to a displacement in time. In one example of the method 100, determining the power of the demodulated pilot signal may be based on a product of the demodulated pilot signal and a complex conjugate of the demodulated pilot signal subjected to a displacement in time. In one example of the method 100, determining the power of the demodulated pilot signal may be based on a difference between an expectation of a real operator of the product and an expectation of an imaginary operator of the product.

In one example, the aggressor cell may include a macro base station. In one example, the aggressor cell may include a pico cell. In one example, the aggressor cell may include a femto cell. In one example, the aggressor cell may include a relay.

In one example, the method 100 may be implemented on a chip, e.g. a chip of a mobile device. In one example, the method 100 may be implemented in a device 200 as described below with respect to FIG. 2.

In one example, the signal representing a two-dimensional time-frequency signal pattern may include a signal pattern 400 as described below with respect to FIG. 4, i.e. a signal pattern including data signals "D", control signals "C", and reference signals "R0", "R1", "R2", "R3", "R4" and "R5". The two-dimensional signal pattern may also be denoted as "resource block" or more particular as "RBSF" (resource block subframe). The signal pattern may be specified according to 3GPP technical specification 36.211, e.g. version V8.4.0 or higher. The transmission of CRS from aggressor cells may cause unwanted interference on PHICH, PCFICH, PDCCH and PDSCH of the target cell.

Figure 4:
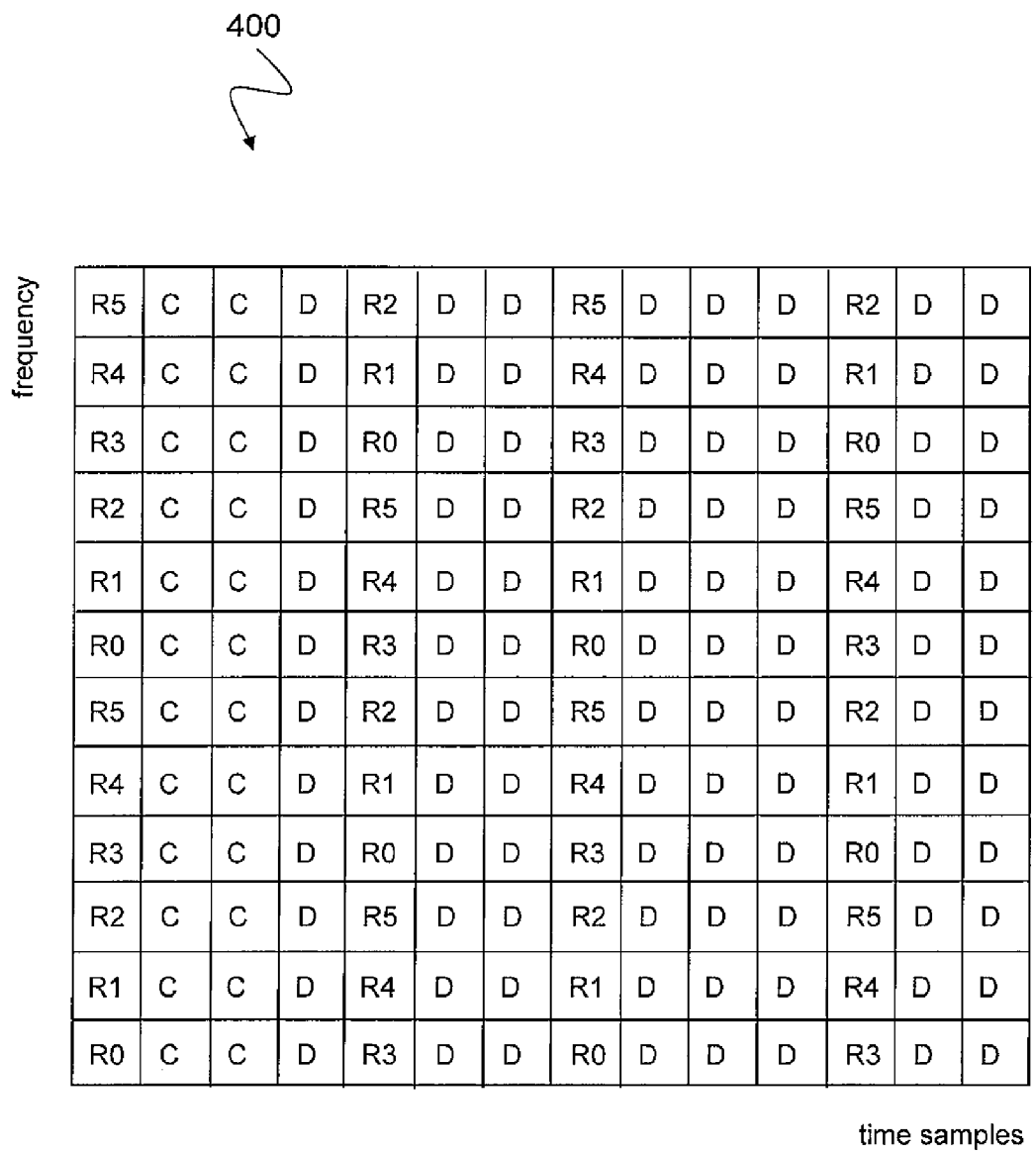
FIG. 4 is a schematic diagram of a receive signal including reference signals in a two-dimensional time-frequency representation 400.

FIG. 4 illustrates the REs of different physical channels that may be affected by CRS interference from non-colliding aggressors. The symbols "R0" denote CRS antenna port 0 of target cell with CRS-shift 0. The symbols "R3" denote CRS antenna port 1 of target cell with CRS-shift 0. The symbols "D" denote data REs with no CRS interference from aggressors. The symbols "C" denote PDCCH REs with no CRS interference from aggressors. The symbols "R1" denote Data/PDCCH REs with CRS interference from aggressor at antenna port 0 and CRS-shift 1. The symbols "R4" denote Data/PDCCH REs with CRS interference from aggressor at antenna port 1 and CRS-shift 1. The symbols "R2" denote Data/PDCCH REs with CRS interference from aggressor at antenna port 0 and CRS-shift 2. The symbols "R5" denote Data/PDCCH REs with CRS interference from aggressor at antenna port 1 and CRS-shift 2.

One can observe in FIG. 4 that REs of the target cell can be classified according to interference structure and levels experienced by them as follows:

1) CRS, PDCCH & PDSCH REs with negligible interference. The noise covariance of the corresponding REs can be modeled as $$R_n^{NoInterf} = \sigma_n^2 I \qquad (1)$$

where $\sigma_n^2$ is the variance of AWGN (Additive White Gaussian Noise).

2) PDCCH & PDSCH REs experiencing high CRS interference from the aggressors. The interference+noise covariance matrix at data REs hit by CRS of aggressors (antenna port-i & CRS shift-v as described below with respect to FIG. 4) can be expressed as $$R_n^{v,AP-i} = \sum_{j=1}^{Nv} h_{j,AP-i} h_{j,AP-i}^H + \sigma_n^2 I \qquad (2)$$

where $N_V$ is the number of dominating aggressors with CRS shift v and $h_{j,AP-i}$ is the channel of the j-th aggressor from antenna port AP-i.

Motivated by the fact that reliable soft bits may be the key factor for reduced outage for medium and low code rates, a low complexity CRS interference mitigation scheme as one exemplary implementation of the method 100 is presented in the following which may perform optimum SINR scaling of the soft bits hence properly utilizing the channel decoder.

Taking into account the above interference model, two algorithms for aggressor CRS interference power estimation and a linear CRS interference mitigation scheme by employing one of the CRS power estimation algorithms to achieve optimum SINR scaling are described in the following. These algorithms and schemes are exemplary implementations of the method 100 described above.

The first aggressor CRS interference power estimation algorithm may be denoted as "pilot difference based power estimation" while the second aggressor CRS interference power estimation algorithm may be denoted as "M1M2 power estimation", where M1 denotes a first moment and M2 denotes a second moment as defined below. The linear CRS interference mitigation scheme may also be denoted as CRS interference mitigation (IM) through optimum SINR scaling. The "pilot difference based power estimation" algorithm and the "M1M2 power estimation" algorithm may be two blind power estimation algorithms which can be used for CRS Interference mitigation.

The "pilot difference based power estimation" algorithm can be described by the following blocks or items:

Block 1: Compute difference $e_i(n,n-1)$ between two neighboring demodulated pilots (AP-i) of the aggressor, where AP-i denotes the antenna port no. i, e.g. 1 to 4 as described below with respect to FIG. 4.

$$e_i(n,n-1) = \tilde{h}_i(n) - \tilde{h}_i(n-1) = e_i(n) - e_i(n-1)$$

$$\tilde{h}_i(n) = h_i(n) + e_i(n)$$

$$\tilde{h}_i(n-1) = h_i(n-1) + e(n-1) \qquad (3)$$

where $\tilde{h}_i(n)$ denotes the demodulated pilot at sub-carrier n and $\tilde{h}_i(n-1)$ denotes the demodulated pilot at sub-carrier n-1.

Block 2: Estimate interference and noise power $\hat{\sigma}_{e,i}^2$ experienced by the pilots (AP-i) of the aggressor $$\hat{\sigma}_{e,i}^2 = \frac{1}{2} E(e_i(n, n-1)^H e_i(n, n-1)) \qquad (4)$$

$$= \frac{1}{2} (E(e_i^H(n) e_i(n)) + E(e_i(n-1) e_i^H(n-1)) + n_{estbias})$$

$$= \frac{1}{2} (2\sigma_{e,i}^2 + n_{estbias}) \approx 2\sigma_{e,i}^2,$$

where $$n_{estbias} = E\left(\sqrt{\sigma_{e,i}^2(n) \sigma_{e,i}^2(n-1)} \, \text{corr}(e_i(n), e_i(n-1))\right) \qquad (5)$$

$$= E(\sigma_{e,i}^2 \text{corr}(e_i(n), e_i(n-1)))$$

and $\hat{\sigma}_{e,i}^2$ denotes the noise power estimate.

Block 3: Estimate CRS interference power estimation ($\hat{\sigma}_{h,i}^2$) from AP-i $$M_2 = E(\tilde{h}_i^H \tilde{h}_i) = (h_i^H h_i) + \sigma_{e,i}^2,$$

$$\hat{\sigma}_{h,i}^2 = M_2 - \hat{\sigma}_{e,i}^2 \qquad (6)$$

where $M_2$ denotes the signal plus noise power and $\hat{\sigma}_{h,i}^2$ denotes the interference power from antenna port AP-i.

It is noted that one or more of blocks 1 to 3 may be consecutively implemented. Alternatively, one or more of blocks 1 to 3 may be implemented in parallel or in any other appropriate sequence.

The "M1M2 power estimation" algorithm can be described by the following blocks or items:
Block 1: Estimation of second-order moment $M_2$ on the demodulated pilots (AP-i) of the aggressor, where AP-i denotes the antenna port no. i, e.g. 1 to 4 as described below with respect to FIG. 4.

$$M_2 = \tag{7}$$

$$E(|\Re(\tilde{h}_i(n) \times \tilde{h}_i^*(n-1))|) = E(\|\tilde{h}_i\|^2) + E\left(\sqrt{\|\tilde{h}_i\|^2 + \sigma_{e,i}^2}\right) + E\left(\frac{\sigma_{e,i}^2}{2}\right)$$

where $\Re(\cdot)$ denotes the real operator.
Block 2: Estimation of first-order moment $M_1$ on the demodulated pilots (AP-i) of the aggressor.

$$M_1 = E(|\Im(\tilde{h}_i(n) \times \tilde{h}_i^*(n-1))|) = E\left(\sqrt{\|\tilde{h}_i\|^2 + \sigma_{e,i}^2}\right) + E\left(\frac{\sigma_{e,i}^2}{2}\right) \tag{8}$$

where $\Im(\cdot)$ denotes the imaginary operator.
Block 3: Estimate CRS interference power estimation ($\hat{\sigma}_{h,i}^2$) from antenna port AP-i $$\hat{\sigma}_{h,i}^2 = M_2 - M_1 \tag{9}$$

It is noted that one or more of blocks 1 to 3 may be consecutively implemented. Alternatively, one or more of blocks 1 to 3 may be implemented in parallel or in any other appropriate sequence.

Blocks 1, 2 and 3 of the "pilot difference based power estimation" algorithm and Blocks 1, 2 and 3 of the "M1M2 power estimation" algorithm can be implemented by block 105 of the method 100, i.e. by determining the second covariance measure based on the second signal part of the signal pattern which may be the signal part interfered by the at least one aggressor cell. The second covariance measure can thus be determined by using the interfering power of the at least one aggressor cell determined by one of the methods "pilot based power estimation" and "M1M2 based power estimation" as described above.

In one example, the algorithms for CRS-IM through optimum SINR scaling can be implemented by the following blocks:
Block 1: Estimate noise-covariance based on CRS or DMRS of the target cell.

$$\hat{R}_n^{NoInterf} = E[(y_p - \hat{h}x_p)(y_p - \hat{h}x_p)^H] \approx \sigma_n^2 I \tag{10}$$

where
$y_p$ is the received pilot signal,
$h_p$ is the estimated channel of the target cell,
$x_p$ is the known pilot signal.
Block 2: Perform noise-whitening of undisturbed REs (and the corresponding target cell channel estimates) for the REs using the estimated covariance matrix $\hat{R}_n^{NoInterf}$. Noise-whitening is performed as in the following equations:

$$\tilde{y}_{noInterf} = R_{NW}^{Interf} y_{noInterf}$$

$$\tilde{H}_{noInterf} = R_{NW}^{NoInterf} \hat{H}_{noInterf}, \tag{10a}$$

where $R_{NW}^{NoInterf} = (\text{chol}(\hat{R}_n^{NoInterf}))^{-1}$ denotes the inverse cholesky factorization, $y_{noInterf}$ denotes the data REs of the target cell with no CRS interference and $\hat{H}_{noInterf}$ denotes the channel estimates for the data REs of the target cell with no CRS interference.

Block 3: Perform aggressor CRS interference power estimation of each antenna port i and CRS shift v (CRS interference power estimation of Nv aggressors per CRS shift). CRS interference power can be estimated by using one of the two above mentioned algorithms, i.e. the pilot difference based algorithm or the M1M2 based algorithm.
Block 4: Compute noise covariance matrix for data REs hit by Aggressor CRS from AP i and CRS shift v.

$$R_n^{v,AP-i} = \sum_{j=1}^{Nv} \hat{\sigma}_{h,j,AP-i}^2 I + \hat{R}_n^{NoInterf} \approx \sum_{j=1}^{Nv} \sigma_{h,j,AP-i}^2 I + \sigma_n^2 I \tag{11}$$

where
$N_v$ is the number of dominating aggressors with CRS shift v,
$\hat{\sigma}_{h,j,AP-i}^2$ is the estimated CRS interference power of the j-th aggressor from antenna port AP-i.
Block 5: Perform noise-whitening of the REs (and the corresponding target cell channel estimates) hit by aggressors from antenna port AP-i and CRS shift-v using the estimated covariance matrix Noise-whitening is performed as in the following equations:

$$\tilde{y}^{v,AP-i} = R_{NW}^{v,AP-i} y^{v,AP-i}$$

$$\tilde{H}^{v,AP-i} = R_{NW}^{v,AP-i} H^{v,AP-i}, \tag{11a}$$

where $R_{NW}^{v,AP-i} = (\text{chol}(R_n^{v,AP-i}))^{-1}$ denotes the inverse cholesky factorization, $y_{noInterf}$ denotes the data REs of the target cell with CRS interference (shift-v, AP-i) and $H^{v,AP-i}$ denotes the channel estimates for the data REs of the target cell with CRS interference (shift-v, AP-i).

In the above equation one has to perform inverse-cholesky factorization for each shift and antenna port (maximum of 8 per PRB). One can reduce complexity by the following equations:

$$\tilde{y}^{v,AP-i} = \alpha_{v,AP-i} R_{NW}^{NoInterf} y^{v,AP-i}$$

$$\tilde{H}^{v,AP-i} = \alpha^{v,AP-i} R_{NW}^{NoInterf} H^{v,AP-i}, \tag{11b}$$

where $$\alpha^{v,AP-i} = \sqrt{\frac{\text{trace}(\hat{R}_{NW}^{NoInterf})}{\text{trace}(R_n^{v,AP-i})}}$$

is a scaling factor, $y_{noInterf}$ denotes the data REs of the target cell with CRS interference (shift-v, AP-i) and $H^{v,AP-i}$ denotes the channel estimates for the data REs of the target cell with CRS interference (shift-v, AP-i).
Block 6: Perform Blocks 4 and 5 for each antenna port and CRS shift. Blocks 4 and 5 are not done on the REs with CRS shift of the target cell (position of REs where CRS of target cell is transmitted).
Block 7: Perform equalization/detection and channel decoding (if applicable).

It is noted that one or more of Blocks 1 to 7 may be consecutively implemented. Alternatively, one or more of Blocks 1 to 7 may be implemented in parallel or in any other appropriate sequence.

Blocks 1 and 2 can be implemented by block 103 of the method 100, i.e. by determining the first covariance measure based on the first signal part of the signal pattern which may be the signal part not interfered by the at least one aggressor cell.

Blocks 3, 4, 5 and 6 can be implemented by block 105 of the method 100, i.e. by determining the second covariance measure based on the second signal part of the signal pattern which may be the signal part interfered by the at least one aggressor cell. Block 7 can be implemented by block 107 of the method 100, i.e. by processing the signal based on first and second covariance measures.

In block 101 of the method 100, a signal representing a 2D (two-dimensional) time-frequency signal pattern may be received. This receive signal may be the received pilot signal $y_P$ used in block 1 of the CRS-IM SINR scaling algorithm described above.

In one example, the method 100 may not perform any interference suppression as the conventional CRS interference rejection or canceling receivers, but may perform Optimum SINR scaling which may produce reliable soft bits for the channel decoder and may perform optimum soft bit combining for HARQ as opposed to a conventional CRS puncturing receiver.

The method 100 can also be used together with a CRS interference canceling receiver or a CRS interference rejection receiver or a parametric interference mitigation receiver as described below with respect to FIG. 7. The number of aggressor channel estimates can be limited to a few dominating aggressors, and the CRS interference of the remaining aggressors can be handled by the method 100 as described herein.

Figure 2:
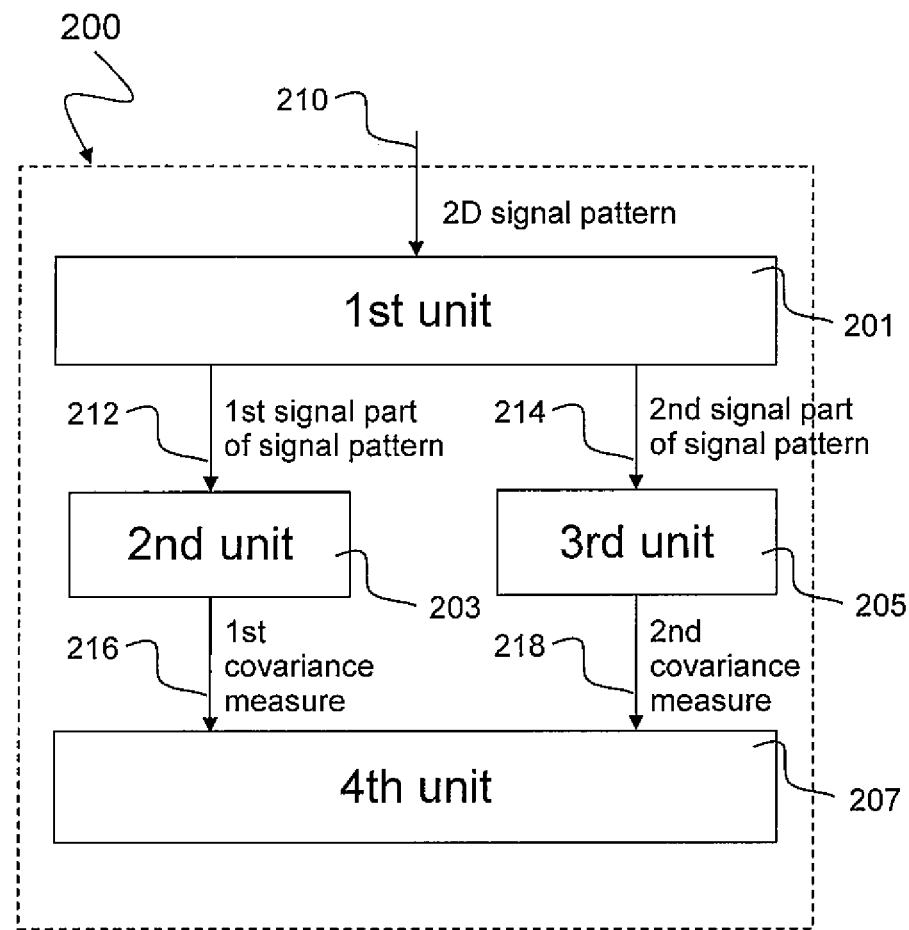
FIG. 2 is a schematic diagram of a device 200 in accordance with the disclosure processing a signal based on a first and a second covariance measure.

FIG. 2 is a schematic diagram of a device 200 in accordance with the disclosure processing a signal based on a first and a second covariance measure.

The device 200, e.g. an SINR scaling receiver, may include a first unit 201, e.g. a receiver, configured to receive a signal representing a two-dimensional time-frequency signal pattern 210, e.g. as depicted in FIG. 4 described below. The device 200 may include a second unit 203 configured for determining a first covariance measure 216 based on a predetermined first signal part 212 of the signal pattern 210. The device 200 may include a third unit 205 configured for determining a second covariance measure 218 based on a predetermined second signal part 214 of the signal pattern 210. The device 200 may include a fourth unit 207 configured for processing the signal 210 based on the first covariance measure 216 and the second covariance measure 218.

In one example, the third unit 205 may be configured for determining the second covariance measure 218 based on a power estimation with respect to a pilot signal of at least one aggressor cell. In one example, the third unit 205 may be configured for performing the power estimation including determining a difference of the demodulated pilot signal and the demodulated pilot signal subjected to a displacement in time. In one example, the third unit 205 may be configured for determining the second covariance measure 218 based on an estimation of a first-order moment and a second-order moment with respect to a pilot signal of at least one aggressor cell. In one example, the third unit 205 may be configured for estimating the first-order moment and the second-order moment including determining a product of the demodulated pilot signal and a complex conjugate of the demodulated pilot signal subjected to a displacement in time. In one example, the third unit 205 may be configured for determining the first-order moment based on a real operator of the product and for determining the second-order moment based on an imaginary operator of the product.

In one example, the first unit 201 may be configured for performing the block 101 of the method 100 as described above with respect to FIG. 1. In one example, the second unit 203 may be configured for performing the block 103 of the method 100 as described above with respect to FIG. 1. In one example, the third unit 205 may be configured for performing the block 105 of the method 100 as described above with respect to FIG. 1. In one example, the fourth unit 207 may be configured for performing the block 107 of the method 100 as described above with respect to FIG. 1.

In one example, the device 200 may include a chip, and the device 200 may be part of a mobile device.

In one example, the second unit 203 can be configured for implementing blocks 1 and 2 of the CRS-IM SINR scaling algorithm as described above with respect to FIG. 1. In one example, the third unit 205 can be configured for implementing blocks 3, 4, 5 and 6 of the CRS-IM SINR scaling algorithm. In one example, the third unit 207 can be configured for implementing block 7 of the CRS-IM SINR scaling algorithm.

Figure 3:
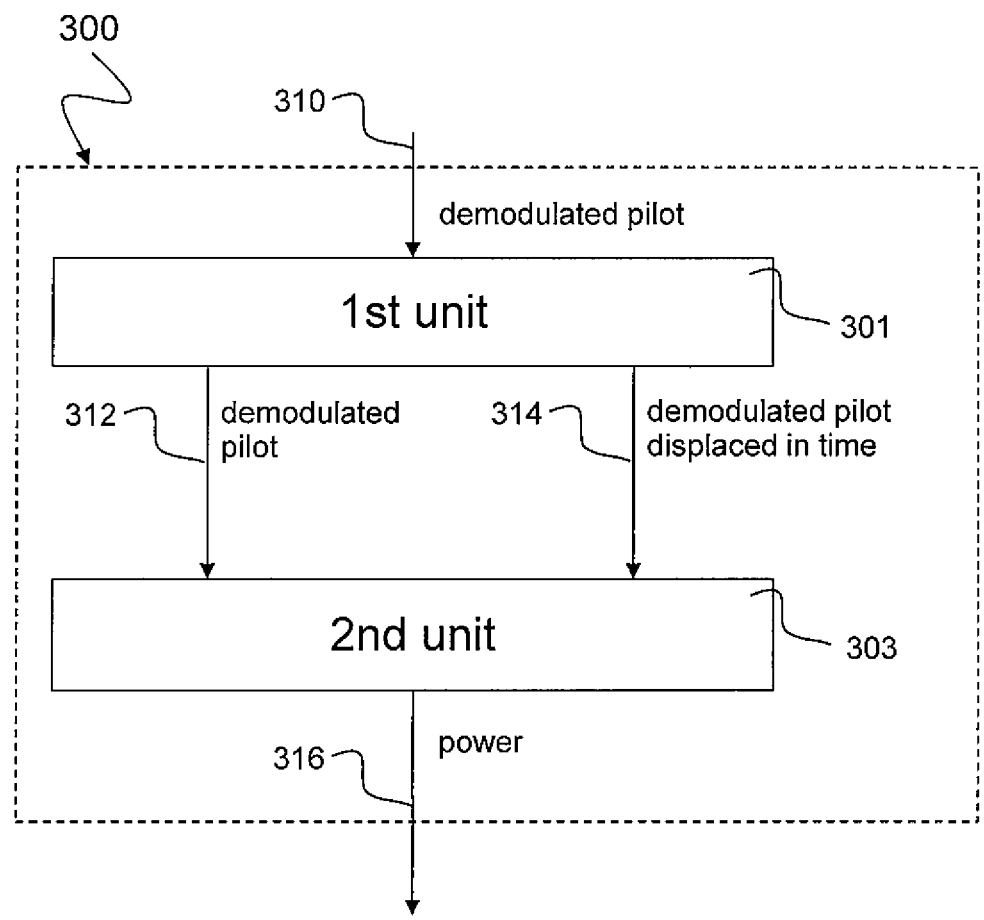
FIG. 3 is a schematic diagram of a device 300 in accordance with the disclosure for determining a power of a demodulated pilot signal.

FIG. 3 is a schematic diagram of a device 300, e.g. a power estimator in accordance with the disclosure for determining a power of a demodulated pilot signal. The device 300 may include a first unit 301 configured for receiving a demodulated pilot signal 310. The device 300 may include a second unit 303 configured for determining a power 316 of the demodulated pilot signal 310 based on the demodulated pilot signal 310 and the demodulated pilot signal subjected to a displacement in time 314.

In one example, the second unit 303 may be configured for determining the power 316 of the demodulated pilot signal 310 based on a covariance measure of a difference of the demodulated pilot signal 310 and the demodulated pilot signal subjected to a displacement in time 314. In one example, the second unit 303 may be configured for determining the power 316 of the demodulated pilot signal 310 based on a product of the demodulated pilot signal 310 and a complex conjugate of the demodulated pilot signal subjected to a displacement in time 314. In one example, the second unit 303 may be configured for determining the power 316 of the demodulated pilot signal 310 based on a difference between an expectation of a real operator of the product and an expectation of an imaginary operator of the product.

In one example, the device 300 may be used for determining powers of aggressor cells used in the method 100 described above with respect to FIG. 1.

In one example, the device 300 may be part of the third unit 205 described above with respect to FIG. 2 and may be used for determining the interference power estimation of aggressor cells.

In one example, the first unit 301 of the device 300 can be configured for receiving the demodulated pilot signal and providing the demodulated pilot signal and the demodulated pilot signal displaced in time. In one example, the second unit 303 of the device 300 can be configured for implementing the blocks 1, 2 and 3 of the "pilot difference based power estimation" algorithm and/or the "M1M2 power estimation" algorithm, i.e. for providing the interference power based on the demodulated pilot and the demodulated pilot displaced in time. A displacement in time may denote a time shift of the demodulated pilot resulting in a time delay of one or multiple time units.

FIG. 4 is a schematic diagram of a receive signal including reference signals in a two-dimensional time-frequency representation 400. The horizontal axis denotes the time samples and the vertical axis denotes the frequency. The signal pattern includes data signals "D", control signals "C", and reference signals "R0", "R1", "R2", "R3", "R4" and "R5". In one example, data and control signals may be not distorted by aggressor cells.

The two-dimensional signal pattern may also be denoted as "resource block" or more particular as "RBSF" (resource block subframe). An RBSF may be defined as a block having a length of one resource block (e.g. 180 kHz) in the frequency direction and a length of one subframe (e.g. 1 ms) in the time direction.

The two-dimensional time-frequency representation 400 may be specified according to the 3GPP technical specification 36.211, e.g. version V8.4.0 or higher. In an ABS scenario, only LTE Rel-8 cell specific reference signals (CRS), synchronization signals and broadcast messages may be transmitted to enable full backward compatibility. The transmission of CRS, however, may cause unwanted interference on PHICH, PCFICH, PDCCH and PDSCH in the midst of this "interference-free tunnel". FIG. 4 illustrates the REs of different physical channels that may be affected by CRS interference from non-colliding aggressors.

The symbols "R0" denote CRS antenna port 0 of target cell with CRS-shift 0. The symbols "R3" denote CRS antenna port 1 of target cell with CRS-shift 0. The symbols "D" denote data REs with no CRS interference from aggressors. The symbols "C" denote PDCCH REs with no CRS interference from aggressors. The symbols "R1" denote Data/PDCCH REs with CRS interference from aggressor at antenna port 0 and CRS-shift 1. The symbols "R4" denote Data/PDCCH REs with CRS interference from aggressor at antenna port 1 and CRS-shift 1. The symbols "R2" denote Data/PDCCH REs with CRS interference from aggressor at antenna port 0 and CRS-shift 2. The symbols "R5" denote Data/PDCCH REs with CRS interference from aggressor at antenna port 1 and CRS-shift 2.

In one example, the two-dimensional signal pattern 400 may include a resource block of an Orthogonal Frequency Division Multiplexing system. In one example, the received signal may include a radio signal including a plurality of radio frames, each radio frame including a plurality of subframes and each subframe including a plurality of subcarriers. In one example, the target cell and the interfering cell may be dimensioned according to an LTE standardization, in particular to Release 10 or higher thereof, including eICIC. In one example, the target cell may be a pico cell and the interfering cell may be a macro cell of a heterogeneous LTE network as described below with respect to FIGS. 5 and 6.

In a time-domain eICIC scenario with non-colliding Common Reference Signals (CRS), a UE at the cell boundary of a victim cell may be scheduled during ABS subframes of the aggressor cells. During an ABS subframe, the interference for PDSCH transmission may be reduced significantly—however, the aggressor cells may continue to transmit CRS signals (there exists a second possibility of scheduling MBSFN-ABS subframes; these subframes do not transmit any CRS signals—however, many network operators prefer not to schedule any MBSFN-ABS subframes). The CRS signals do not necessarily collide with the CRS signals of the victim cell and may present a significant disturbance for the PDSCH and PDCCH transmission. In FIG. 4, one exemplary RBSF received at a UE is illustrated. In a time-domain eICIC scenario with colliding common reference signals (CRS), not depicted in FIG. 4, two reference signals of different interfering cell may collide and the signal pattern includes reference signals of these two interfering cells at time-frequency positions.

Figure 5:
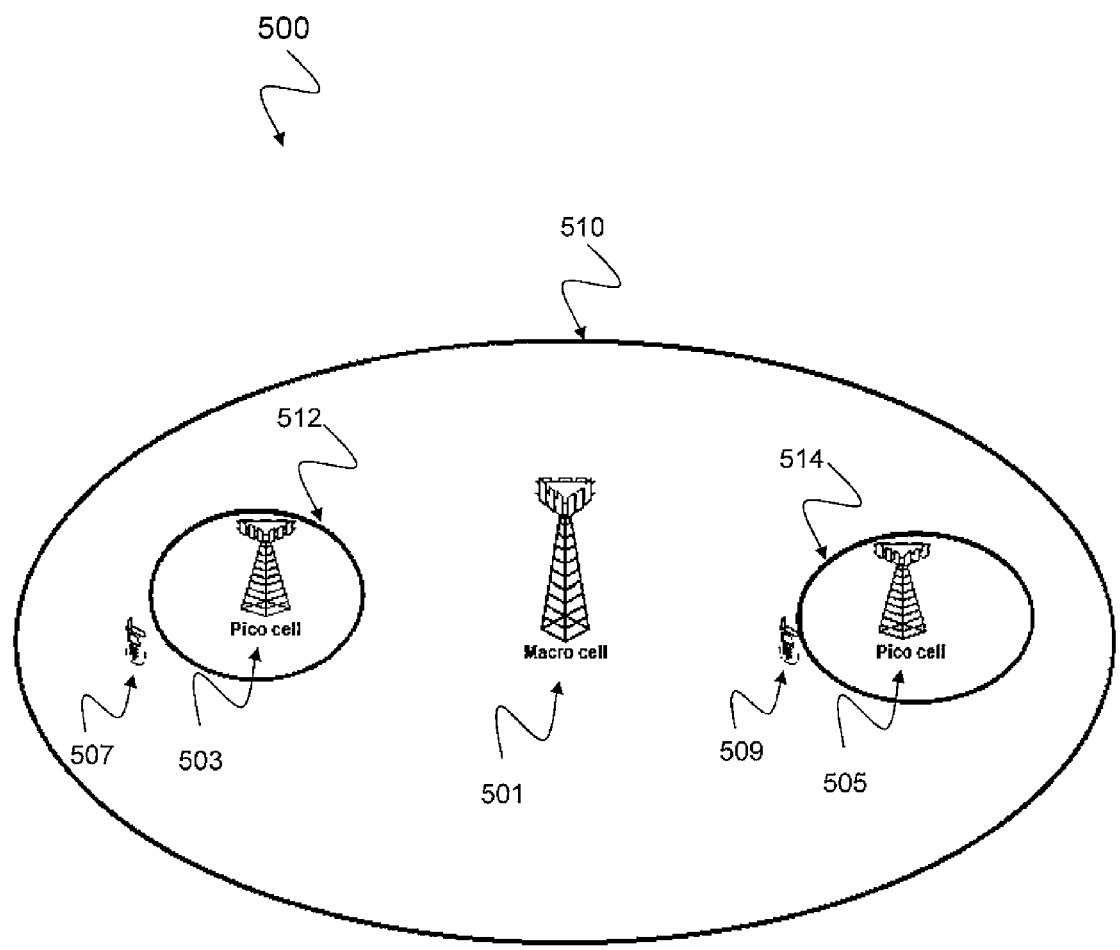
FIG. 5 is a schematic diagram of a heterogeneous network 500 including a macro cell and pico cells.

FIG. 5 is a schematic diagram of a heterogeneous network 500 including a macro cell 501 and pico cells 503, 505. The pico base stations 503, 505 may be characterized by substantially lower transmit power as compared to the macro base station 501. Due to the large disparity between the transmit power levels among two type of base stations, the coverage 512, 514 of the pico base station 503, 505 may be significantly limited than the coverage 510 of the macro base station 501 as shown in FIG. 5. The larger coverage 510 of the macro cells 501 may attract more users 507, 509 towards high power macro eNodeB although there might not be enough resources to efficiently serve all user terminals. At the same time the resources of smaller power base station may remain underutilized.

The method 100 as described above with respect to FIG. 1 may be applied in the heterogeneous network 500. The user equipments 507, 509 may implement the methods 100, 300 for flexibly connecting to either a macro cell 501 or a pico cell 503, 505. In addition, the device 200 described above with respect to FIG. 2 may be implemented in the user equipments 507, 509.

Figure 6:
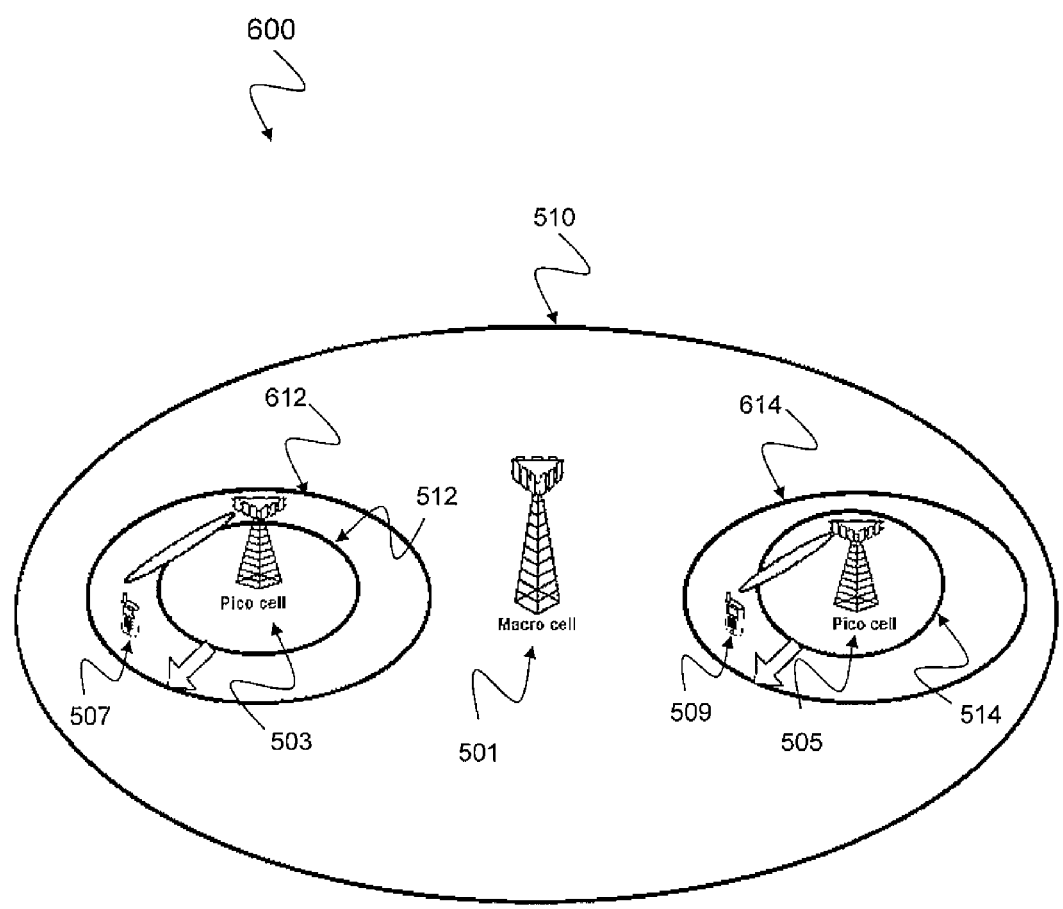
FIG. 6 is a schematic diagram of a heterogeneous network 600 illustrating cell range expansion of pico cells.

FIG. 6 is a schematic diagram of a heterogeneous network 600 illustrating cell range expansion of pico cells. In order to enable pico UEs to operate in harsh interference scenarios, the concept of cell range expansion may be introduced. The cell range 512, 514 of the pico cell 503, 505 may be expanded to an expanded range 612, 614 in order to allow more terminals to connect to the pico eNodeB 503, 505 as shown in FIG. 6. With cell range expansion, traffic may be offloaded from the macro cell and a more balanced load distribution across the various nodes may be achieved.

The method 100 as described above with respect to FIG. 1 may be applied in the heterogeneous network 600. The user equipments 507, 509 may implement the methods 100, 300 for flexibly connecting to either the macro cell 501 or the pico cell 503, 505. The device 200 described above with respect to FIG. 2 may be implemented in the user equipments 507, 509.

Figure 7:
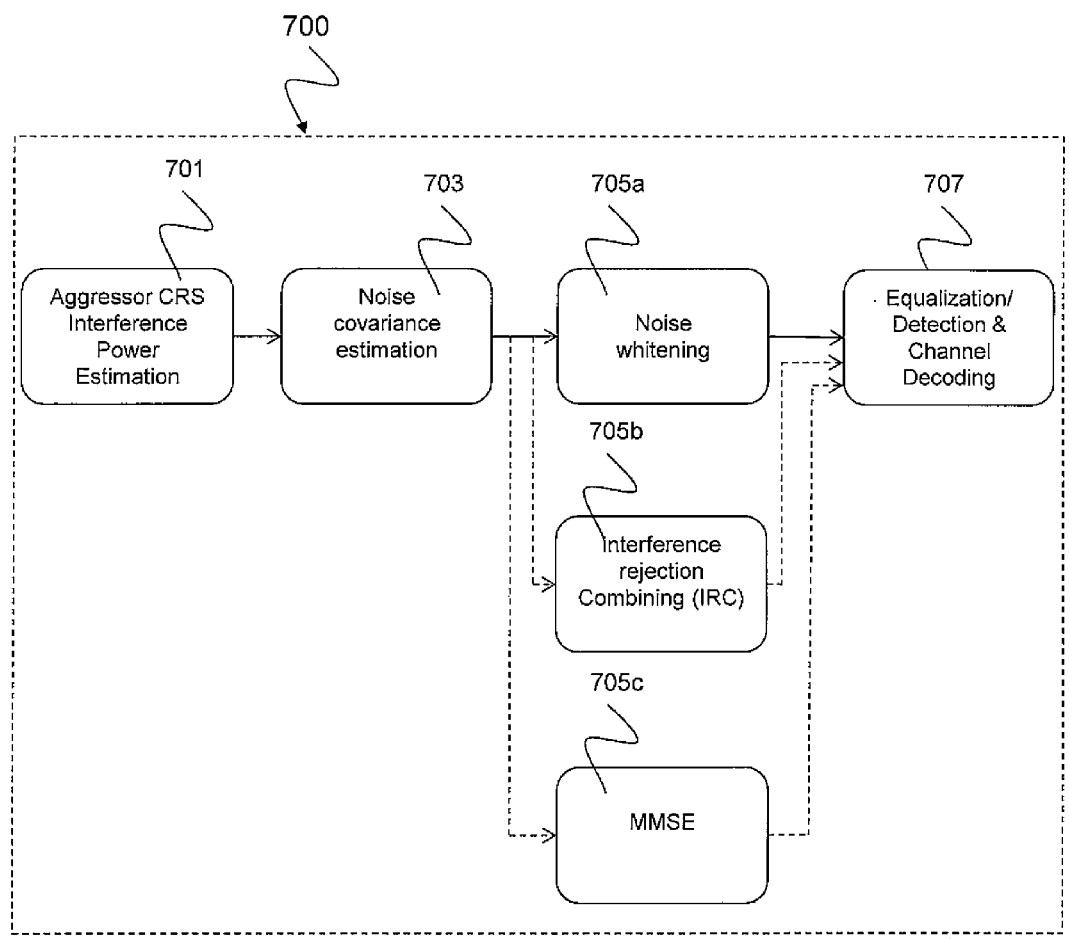
FIG. 7 is a schematic diagram of an SINR scaling receiver 700 in accordance with the disclosure.

FIG. 7 is a schematic diagram of an SINR scaling receiver 700. The SINR scaling receiver 700 may include an aggressor interference power estimation unit 701, a noise covariance estimation unit 703, an interference mitigation unit 705a and an equalization/detection and channel decoding unit 707. The aggressor interference power estimation unit 701 may be configured to estimate interference powers of aggressor cells according to the method 100 described above with respect to FIG. 1. The aggressor interference power estimation unit 701 may correspond to the power estimator 300 as described above with respect to FIG. 3. The noise covariance estimation unit 703 may be configured to estimate noise covariance measures, e.g. noise covariance matrices, as described above with respect to FIG. 1. The noise covariance estimation unit 703 may receive the estimated interference powers of aggressor cells computed by the aggressor interference power estimation unit 701 and may be configured to determine an SINR scaled covariance measure according to the method 100 described above with respect to FIG. 1. The SINR scaled covariance measure may be an optimum SINR scaled covariance measure determined in accordance with some optimization criterion. The interference mitigation unit 705a may perform interference mitigation on the basis of the estimated SINR scaled covariance measure.

In one example, the SINR scaling receiver 700 may include an interference rejection combining unit 705b for performing interference rejection combining based on the (optimum) SINR scaled noise covariance measure.

In one example, the SINR scaling receiver 700 may include a Minimum Mean Square Error estimation (MMSE) unit 705c for performing MMSE estimation based on the (optimum) SINR scaled noise covariance measure.

In one example, the SINR scaling receiver 700 may include a CRS canceling receiver for canceling interfering CRS based on the (optimum) SINR scaled noise covariance measure. The CRS canceling receiver may be any kind of receiver that may cancel CRS REs received from one or more dominant interfering cells from the wanted signal of the serving cell. Knowledge of the CRS REs of the interfering cell(s) may be assumed. Canceling CRS REs from the wanted signal may require channel estimation of the channel from the UE to interfering cell. The wanted signal can be any kind of channel sent by the serving cell including PDSCH, PDCCH, serving cell CRS, etc. A CRS canceling receiver may be principally applicable to e.g. PDSCH and PDCCH. The receiver may cancel the interference based on the estimated covariance measures, estimated according to the method 100 described above with respect to FIG. 1.

In one example, the SINR scaling receiver 700 may be configured as a parametric interference mitigation receiver performing parametric interference mitigation according to a method for parametric interference mitigation, e.g. a method for parametric CRS interference mitigation as described in the following.

Item 1: Estimate noise covariance based on CRS or DMRS of the target cell according to $$\hat{R}_n^{NoInterf} = E[(y_p - \hat{h}_p x_p)(y_p - \hat{h}_p x_p)^H] \approx \sigma_n^2 I \quad (12)$$

where $y_p$ is the received pilot signal, $\hat{h}_p$ is the estimated channel of the target cell, and $x_p$ is the known pilot signal.

Item 2: Perform noise whitening of undisturbed REs (and the corresponding target cell channel estimates) for the REs using the estimated covariance matrix $\hat{R}_n^{NoInterf}$.

Item 3: Perform aggressor channel estimation of each antenna port i and CRS shift v (channel estimation of Nv aggressors per CRS shift).

Item 4: Compute noise covariance matrix for data REs hit by aggressor CRS from AP i and CRS shift v according to $$R_n^{v,AP-i} = \sum_{j=1}^{N_v} \hat{h}_{j,AP-i} \hat{h}_{j,AP-i}^H + \hat{R}_n^{NoInterf} \approx \sum_{j=1}^{N_v} h_{j,AP-i} h_{j,AP-i}^H + \sigma_n^2 I \quad (13)$$

where $N_v$ is the number of dominating aggressors with CRS shift v and $\hat{h}_{j,AP-i}^H$ is the channel of the j-th aggressor from antenna port AP-i.

Item 5: Perform noise whitening of the REs (and the corresponding target cell channel estimates) hit by aggressors from AP-i and CRS shift-v using the estimated covariance matrix $R_n^{v,AP-i}$.

Item 6: Perform Items 4 and 5 for each antenna port and CRS shift. Steps 4 and 5 are not necessarily performed on the REs with CRS shift of the target cell (position of REs where CRS of target cell is transmitted).

Item 7: Perform equalization/detection.

Item 8: Channel decoding (if applicable).

Items 1 and 2 of the method for parametric interference mitigation can correspond to Blocks 1 and 2 of the CRS-IM SINR scaling method as described above with respect to FIG. 1.

Item 3 of the method for parametric interference mitigation, i.e. aggressor channel estimation, can be applied by using the aggressor power estimated according to Block 3 of the CRS-IM SINR scaling method described above with respect to FIG. 1. CRS interference power can be estimated by using one of the two interference power estimation algorithms described above with respect to FIG. 1, i.e. the pilot difference based algorithm or the M1M2 based algorithm.

Item 4 of the method for parametric interference mitigation, i.e. noise covariance matrix estimation for data REs hit by aggressor CRS from AP i and CRS shift v, can be applied by using Block 4 of the CRS-IM SINR scaling method as described above with respect to FIG. 1, i.e. by using the estimated CRS interference power of the j-th aggressor from antenna port AP-i instead of using the estimated channel of the j-th aggressor. Thus, computational complex channel estimation can be avoided or at least be reduced in complexity.

Items 5 and 6 of the method for parametric interference mitigation can correspond to Blocks 5 and 6 of the CRS-IM SINR scaling method as described above with respect to FIG. 1. Items 7 and 8 of the method for parametric interference mitigation can correspond to Block 7 of the CRS-IM SINR scaling method as described above with respect to FIG. 1.

When configuring the SINR scaling receiver 700 as a parametric interference mitigation receiver, the number of aggressor channel estimates can be limited to a few dominating aggressors and the CRS interference of the remaining aggressors can be handled by the method 100 as described above with respect to FIG. 1.

Interference mitigation using the method for parametric CRS interference mitigation during ABS may perform Optimum Combining and hence may result in interference suppression, i.e. increased post-equalization SINR at reduced raw BER and optimum SINR scaling, i.e. reliable soft bits for the channel decoder. Reduced raw BER and reliable soft bits may reduce BLER irrespective of modulation and code rate.

An exemplary SINR scaling receiver 700 may provide the following processing blocks:

1) estimation of CRS interference power of the aggressors;
2) estimation of the interference+noise covariance matrix for REs severely hit by CRS of aggressor by using the estimated CRS interference power of the aggressor and noise covariance estimates measured on the target cell pilots (CRS or DMRS);
3) noise whitening using the estimated covariance matrices to suppress interference and also achieving optimal SINR scaling hence reduced outage.

Employing the method 100 described above with respect to FIG. 1 together with a CRS canceling or CRS Interference rejection receiver, e.g. a receiver including an MMSE unit 705c or an interference rejection combining unit 705b as depicted in FIG. 7, may limit UE complexity and may achieve increased handling of CRS interference (number of aggressors).

An SINR scaling receiver 700 and a method as described above with respect to FIG. 1 may thus provide the following effects: Robust performance over a wide range of geometries, similar performance as a CRS canceling receiver at low geometries and very low complexity, since no channel estimation of aggressor may be required.

Figure 8A:
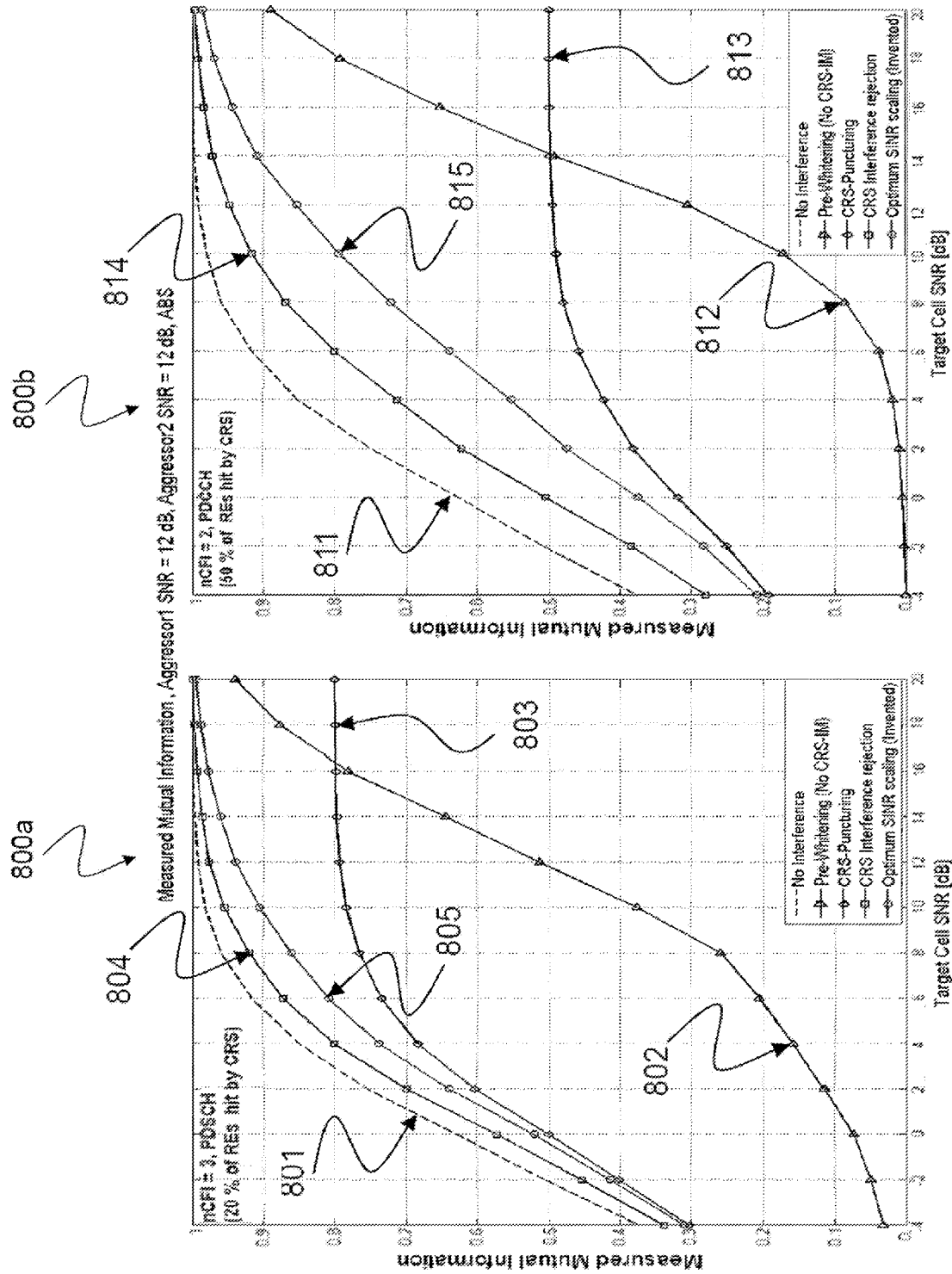
FIG. 8a is a performance diagram illustrating mutual information in percentage before the input of a channel decoder of the receiver 700 for two different interference scenarios.

FIG. 8a shows a performance diagram illustrating mutual information in percentage before the input of a channel decoder of the receiver 700 for two different interference scenarios. Two aggressors at 12 dB are interfering in an ABS scenario. The graph 800a on the left-hand side depicts PDSCH processing with nCFI=3 and illustrates the interference scenario of 20% of resource elements hit by CRS. The graph 800b on the right-hand side depicts PDCCH processing with nCFI=2 and illustrates the interference scenario of 500 of resource elements hit by CRS. In the graph 800a on the left-hand side, the "no interference" scenario is depicted by a first curve 801, the "pre-whitening (no CRS-IM)" scenario is depicted by a second curve 802, the "CRS-puncturing" scenario is depicted by a third curve 803, the "CRS-interference rejection" scenario is depicted by a fourth curve 804, and the "optimum SINR scaling" scenario is depicted by a fifth curve 805. In the graph 800b on the right-hand side, the "no interference" scenario is depicted by a first curve 811, the "pre-whitening (no CRS-IM)" scenario is depicted by a second curve 812, the "CRS-puncturing" scenario is depicted by a third curve 813, the "CRS-interference rejection" scenario is depicted by a fourth curve 814, and the "optimum SINR scaling" scenario is depicted by a fifth curve 815.

The mutual information was measured after equalization which depicts the quality of the soft bits input to the channel decoder and the maximum of the achievable capacity. Different scenarios relevant for PDSCH and PDCCH are depicted in FIG. 8a and the following can be observed.

The performance of CRS interference rejection 804 and optimum SINR scaling 805 may be similar for PDSCH, since the percentage of REs hit by CRS interference is relatively small (20%) and the majority of gains achieved in comparison with no CRS interference handling is due to optimum SINR scaling.

The performance of the optimum SINR scaling receiver 805 for PDSCH does not necessarily floor at higher Mutual information like a CRS puncturing receiver 803. This implies the optimum SINR scaling receiver 805 can also be employed for higher coding rates.

The performance of the optimum SINR scaling receiver 805 for PDCCH may be inferior to that of the CRS interference rejection receiver 804, since the percentage of REs hit by CRS interference is large (50%) and the gain got just by optimum SINR scaling is limited. It is noted that the performance gain of the optimum SINR scaling receiver 805 over a receiver without CRS interference handling may be still significant.

As opposed to a CRS puncturing receiver 803, the optimum SINR scaling receiver 805 can also be used for PDCCH CRS interference mitigation.

Figure 8B:
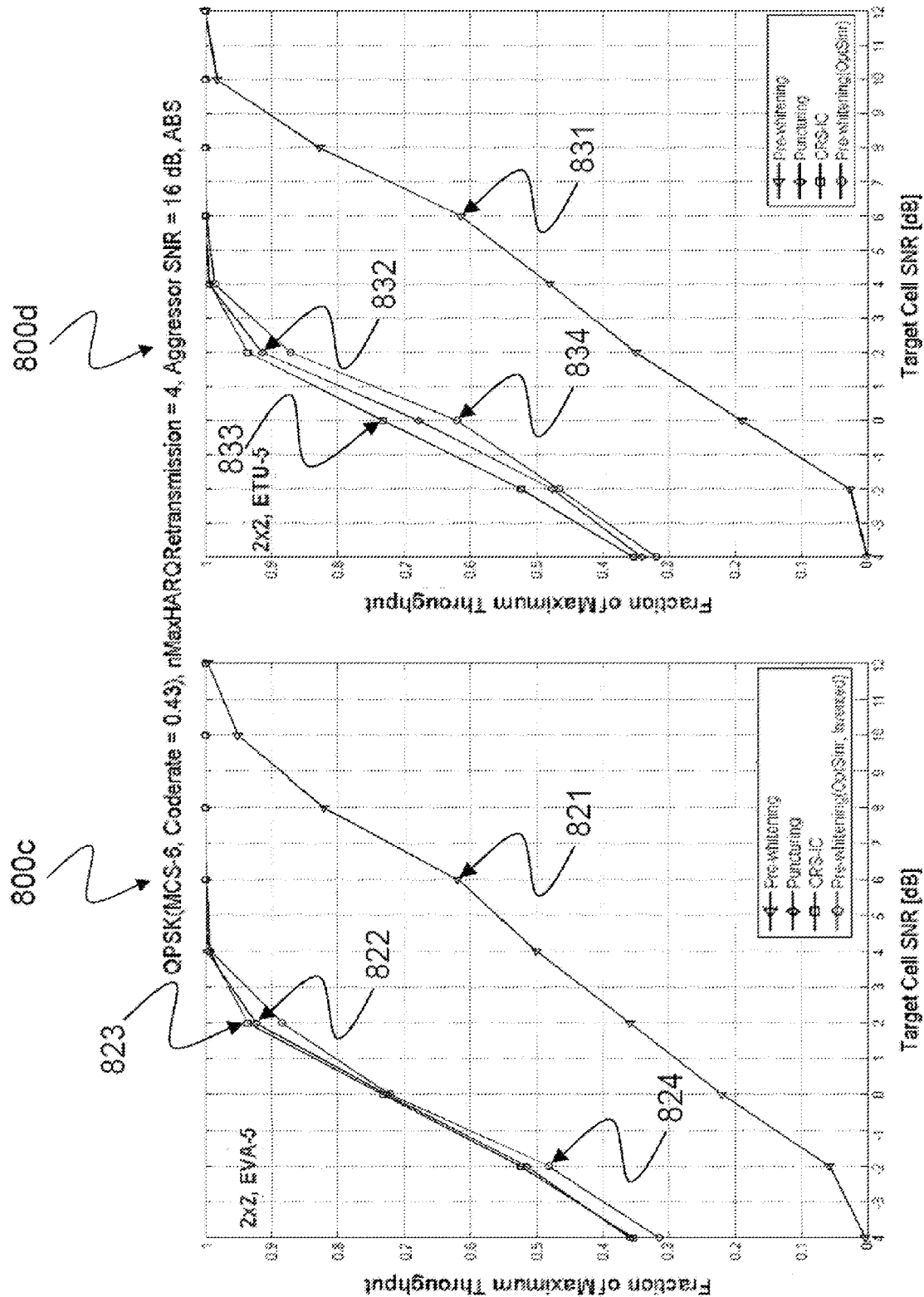
FIG. 8b is a performance diagram illustrating data throughput of an SINR scaling receiver 700 for a MCS-6 (QPSK 1/3) modulation and coding scheme and two different channel scenarios.
Figure 8C:
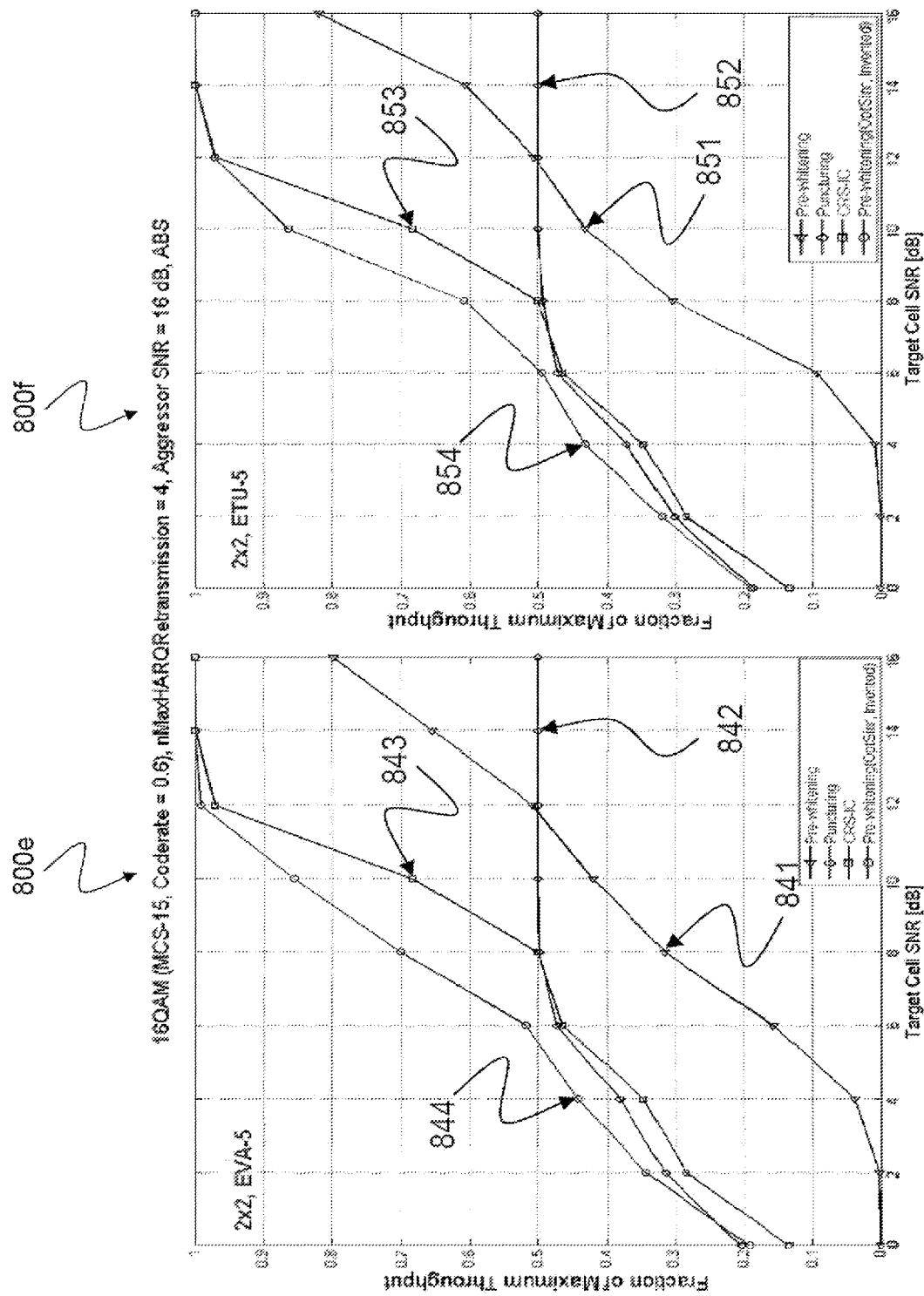
FIG. 8c is a performance diagram illustrating data throughput of an SINR scaling receiver 700 for a MCS-15 (16-QAM 0.6) modulation and coding scheme and two different channel scenarios.
Figure 8D:
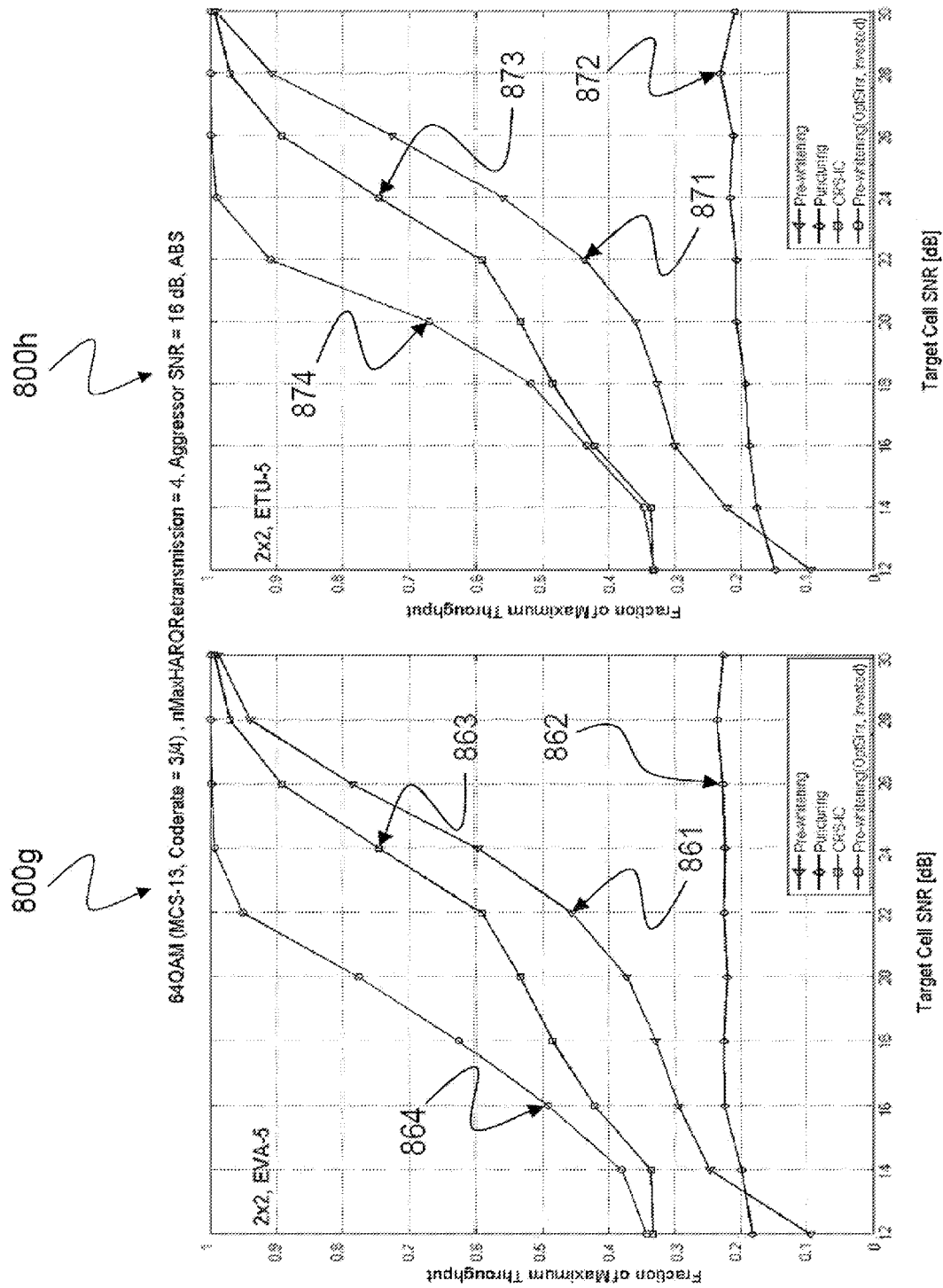
FIG. 8d is a performance diagram illustrating data throughput of an SINR scaling receiver 700 for a MCS-24 (64-QAM 3/4) modulation and coding scheme and two different channel scenarios.

FIGS. 8b, 8c and 8d show performance diagrams illustrating data throughput of an SINR scaling receiver 700 for a MCS-6 (QPSK 1/3) modulation and coding scheme (FIG. 8b), for a MCS-15 (16-QAM 0.6) modulation and coding scheme (FIG. 8c), for a MCS-24 (64-QAM 3/4) modulation and coding scheme (FIG. 8d) and two different channel scenarios with EVA-5 and ETU-5 channel models according to 3GPP.

The graph 800c on the left-hand side depicts an EVA-5 channel model. The graph 800d on the right-hand side depicts an ETU-5 channel model. In the graph 800c on the left-hand side, the "pre-whitening" scenario is depicted by a first curve 821, the "puncturing" scenario is depicted by a second curve 822, the "CRS-IC" scenario is depicted by a third curve 823, and the "pre-whitening with optimum SINR scaling" scenario is depicted by a fourth curve 804. In the graph 800d on the right-hand side, the "pre-whitening" scenario is depicted by a first curve 831, the "puncturing" scenario is depicted by a second curve 832, the "CRS-IC" scenario is depicted by a third curve 833, and the "pre-whitening with optimum SINR scaling" scenario is depicted by a fourth curve 834.

The graph 800e on the left-hand side depicts an EVA-5 channel model. The graph 800f on the right-hand side depicts an ETU-5 channel model. In the graph 800e on the left-hand side, the "pre-whitening" scenario is depicted by a first curve 841, the "puncturing" scenario is depicted by a second curve 842, the "CRS-IC" scenario is depicted by a third curve 843, and the "pre-whitening with optimum SINR scaling" scenario is depicted by a fourth curve 844. In the graph 800f on the right-hand side, the "pre-whitening" scenario is depicted by a first curve 851, the "puncturing" scenario is depicted by a second curve 852, the "CRS-IC" scenario is depicted by a third curve 853, and the "pre-whitening with optimum SINR scaling" scenario is depicted by a fourth curve 854.

The graph 800g on the left-hand side depicts an EVA-5 channel model. The graph 800h on the right-hand side depicts an ETU-5 channel model. In the graph 800g on the left-hand side, the "pre-whitening" scenario is depicted by a first curve 861, the "puncturing" scenario is depicted by a second curve 862, the "CRS-IC" scenario is depicted by a third curve 863, and the "pre-whitening with optimum SINR scaling" scenario is depicted by a fourth curve 864. In the graph 800h on the right-hand side, the "pre-whitening" scenario is depicted by a first curve 871, the "puncturing" scenario is depicted by a second curve 872, the "CRS-IC" scenario is depicted by a third curve 873, and the "pre-whitening with optimum SINR scaling" scenario is depicted by a fourth curve 874.

Link level tests as shown in FIGS. 8a to 8d demonstrate the performance of the SINR scaling method 100 as described above with respect to FIG. 1 over conventional CRS interference mitigation schemes. The configurations listed in Table 1 below are used for the performance testing.

TABLE 1

| configurations for the performance testing | |
|---|---|
| Bandwidth | 10 MHz |
| Transmission mode | TM4, Rank1 (Closed loop beam-forming) |
| Antenna configuration | 2 × 2 Low correlation |
| Channel | EVA-5 Hz & ETU-5 Hz |
| Modulation & Coding Scheme | MCS-6 (QPSK 1/3), MCS-15 (16-QAM 0.6) & MCS-24 (64-QAM 3/4) |
| Maximum number of HARQ retransmissions | 4 |
| Channel estimation | 2D-MMSE over 1 PRB, Estimated SINR, Ideal Doppler and Delay spread |
| Aggressor CRS shift | Non-Colliding |
| Aggressor SNR | 16 dB |
| Conventional receivers for bench marking | Receiver with no CRS interference handling, CRS puncturing and canceling receivers |

The target cell SNR [dB] only depicts the ratio between signal power (target cell) and AWGN. The geometry (SINR) can be derived as follows:

Noise Power in Linear scale:

$$N=10^{\wedge}(-\text{Target cell SNR [dB]}/10) \quad (14)$$

Interference Power in Linear scale:

$$I=N*10^{\wedge}(\text{Aggressor SNR [dB]}/10) \quad (15)$$

Geometry [dB]:

$$10*\log 10(1/(I+N)) \quad (16)$$

The following can be observed from FIGS. 8b, 8c and 8d: The CRS IM receiver 824 may outperform conventional receivers without CRS interference suppression capabilities by about 6 dB at 70% throughput. The CRS IM receiver 824 may have similar performance to conventional CRS IM receivers 823 at low SNRs and code rates (FIG. 8*b*). As opposed to a CRS puncturing receiver 822 the CRS IM receiver 824 can be employed even for higher modulation and coding rates. The CRS IM receiver 844 may outperform a CRS canceling receiver 843 by about 1.5 to 4 dB at 70% throughput for medium and high SNRs (FIGS. 8*c* and 8*d*). In contrast to CRS cancellation receivers, the CRS IM receiver may be robust over a wide range of SNRs.

In addition, while a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Furthermore, it is understood that aspects of the disclosure may be implemented in discrete circuits, partially integrated circuits or fully integrated circuits or programming means. Also, the terms "exemplary", "for example" and "e.g." are merely meant as an example, rather than the best or optimal.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

What is claimed is:

1. A method, comprising:
   receiving a signal representing a two-dimensional time-frequency signal pattern;
   determining a frequency covariance measure based on a predetermined first signal part of the signal pattern, which comprises a reference signal;
   determining a time covariance measure based on a predetermined second signal part of the signal pattern, which comprises a data signal; and
   noise whitening the signal based on the frequency covariance measure and the time covariance measure.

2. The method of claim 1, wherein the second signal part of the signal pattern is disturbed by an interference signal of at least one aggressor cell.

3. The method of claim 2, wherein the interference signal comprises one of a cell-specific reference signal and a demodulated reference signal.

4. The method of claim 1, wherein the first signal part of the signal pattern comprises one of a cell-specific reference signal and a demodulated reference signal.

5. The method of claim 1, further comprising:
   noise whitening at least one of an undisturbed signal part of the signal pattern and channel estimates corresponding to the undisturbed signal part by using the frequency covariance measure.

6. The method of claim 1, further comprising:
   noise whitening at least one of a signal part of the signal pattern being disturbed by an interference signal of at least one aggressor cell and channel estimates corresponding to the disturbed signal part by using the time covariance measure.

7. The method of claim 1, wherein the signal is encoded according to an orthogonal frequency division multiplex technique.

8. A device, comprising:
   a first unit configured for receiving a signal representing a two-dimensional time-frequency signal pattern;
   a second unit configured for determining a frequency covariance measure based on a predetermined first signal part of the signal pattern, which comprises a reference signal; and
   a third unit configured for determining a time covariance measure based on a predetermined second signal part of the signal pattern, which comprises a data signal; and
   a fourth unit configured for noise whitening the signal based on the frequency covariance measure and the time covariance measure.

9. The device of claim 8, wherein the third unit is configured for determining the time covariance measure based on a power estimation with respect to a pilot signal of at least one aggressor cell.

10. The device of claim 9, wherein the third unit is configured to perform the power estimation comprising:
    determining a difference of a demodulated pilot signal and the demodulated pilot signal subjected to a displacement in time.

11. The device of claim 8, wherein the third unit is configured for determining the time covariance measure based on an estimation of a first-order moment and a second-order moment with respect to a pilot signal of at least one aggressor cell.

12. The device of claim 11, wherein the third unit is configured to estimate the first-order moment and the second-order moment comprising:
    determining a product of the demodulated pilot signal and a complex conjugate of the demodulated pilot signal subjected to a displacement in time.

13. The device of claim 12, wherein the third unit is configured to determine the first-order moment based on a real operator of the product and to determine the second-order moment based on an imaginary operator of the product.

* * * * *